US008947979B2

(12) United States Patent
Johnson

(10) Patent No.: US 8,947,979 B2
(45) **Date of Patent: *Feb. 3, 2015**

(54) TRANSDUCER MOUNTING BLOCKS AND METHOD OF USE THEREOF

(71) Applicant: Scott E. Johnson, Half Moon Bay, CA (US)

(72) Inventor: Scott E. Johnson, Half Moon Bay, CA (US)

( * ) Notice: Subject to any disclaimer, the term of this patent is extended or adjusted under 35 U.S.C. 154(b) by 148 days.

This patent is subject to a terminal disclaimer.

(21) Appl. No.: 13/673,948

(22) Filed: Nov. 9, 2012

(65) Prior Publication Data

US 2013/0121115 A1 May 16, 2013

Related U.S. Application Data

(63) Continuation-in-part of application No. 29/433,292, filed on Sep. 27, 2012.

(60) Provisional application No. 61/558,932, filed on Nov. 11, 2011.

(51) Int. Cl.
*G10K 11/00* (2006.01)
*F16M 13/00* (2006.01)
*B63B 17/00* (2006.01)

(52) U.S. Cl.
CPC .............. *G10K 11/006* (2013.01); *B63B 17/00* (2013.01)
USPC .......................................... 367/173; 248/200

(58) Field of Classification Search
CPC .............................. B63B 17/00; G10K 11/006
USPC ........................... 367/173; 248/200; D13/118
See application file for complete search history.

(56) References Cited

U.S. PATENT DOCUMENTS

| | | | | |
|---|---|---|---|---|
| 4,811,310 | A * | 3/1989 | Wille | 367/173 |
| 6,928,948 | B1 * | 8/2005 | Shannon | 367/173 |
| 2012/0250466 | A1 * | 10/2012 | Allen | 367/173 |
| 2013/0121115 | A1 * | 5/2013 | Johnson | 367/173 |

OTHER PUBLICATIONS http://www.sternsaver.com/ copyrighted 2011.*
http://www.thehulltruth.com/boating-forum/168075-starboard-adhesive.html#b 2008.*
http://continuouswave.com/ubb/Forum1/HTML/001425.html 2001.*
http://continuouswave.com/ubb/Forum3/HTML/010880.html 2006.*

* cited by examiner

*Primary Examiner* — Daniel Pihulic
(74) *Attorney, Agent, or Firm* — Ray K. Shahani; Kin H. Lai

(57) ABSTRACT

A mounting block for fastening equipment such as a sonar transducer onto the hull or transom of a boat which consists of a flat body portion formed into a predetermined size and shape, the body further having a front face and a back face, the back face further having one or more channel grooves for retaining an adhesive, the channel grooves further having internal surfaces to provide mechanical grip to the hardened adhesive thereby preventing mechanical separation between sonar transducer or other equipment and the mounting block.

7 Claims, 5 Drawing Sheets

TRANSDUCER MOUNTING BLOCKS AND METHOD OF USE THEREOF

RELATED APPLICATIONS

This Application is a non-provisional application of U.S. Ser. No. 61/558,932 filed Nov. 11, 2011, entitled "SONAR TRANSDUCER MOUNT AND METHOD OF USE THEREOF", the present application is also a Continuation-In-Part application of U.S. Design Patent Application No. 29/433,292 filed Sep. 27, 2012, entitled "DESIGN FOR TRANSDUCER MOUNTING BLOCKS", Docket No. SEJ-201, both of which are incorporated herein by reference in their entireties, and claims any and all benefits to which it is entitled therefrom.

FIELD OF THE INVENTION

The present invention relates to a mounting block which provides an anchor point for securing sonar transducers and/or other equipment onto the hull of a boat below the waterline, and more particularly for doing so without the necessity of drilling hole(s) into the transom or hull portions of boats or other watercraft.

BACKGROUND OF THE INVENTION

In general, to install marine electronics, such as sonar or a fish finder, to the hull of a boat, the sonar transducer must be mounted to the transom of the boat below the waterline. Currently, a sonar transducer is mounted by drilling holes into the transom or hull and fastening the sonar transducer to the transom using screws and/or other mechanical means.

Since sonar transducers and other equipment must be installed below the waterline, drilling holes into the hull of a boat can be very problematic and even unsafe as it will result in water intrusion in the form of leaks, dry and wet rot, and water logging. Moreover, since sonar transducers must be replaced from time to time, holes left behind when a sonar transducer is removed must be patched and hence affect the aesthetic and structural integrity of the boat. A sonar transducer may also be mounted to a transom using a mounting block. To use a currently available mounting block, the mounting block must be fastened to the transom of a boat using waterproof adhesive or screws, and a sonar transducer may be fastened to the mounting block. Such current mounting blocks do not resolve the problem of unwanted holes in the hull.

The present invention is a mounting block with various designs which is adhered to the hull or transom of a boat using an adhesive, without mechanical fasteners such as screws, thereby eliminating unwanted holes. Once the mounting block is secured on the transom, a sonar transducer and/or other equipment may be mounted onto it.

ADVANTAGES AND SUMMARY OF INVENTION

The present invention is directed to a mounting block for mounting sonar transducers or other equipment onto the hull of a boat without the need for drilling holes below the waterline, and a method of its use.

One object and advantage of the present invention is to provide a way to mount sonar transducers and other equipment onto a boat hull without drilling holes.

One object and advantage of the present invention is to provide a much safer way to mount sonar transducers onto a boat without running the risk of water intrusion, dry and wet rot, and water logging, or loss of the mounting block and equipment coupled thereto.

Another object and advantage of the present invention is to provide an easier and less time consuming method to mount sonar transducers.

Yet another object and advantage of the present invention is its flexibility to adhere the present invention to any part of the transom of a boat as no holes are required.

Further details, objects and advantages of the present invention will become apparent through the following descriptions, and will be included and incorporated herein.

For a better understanding of the invention reference is made to the following detailed description of the preferred embodiments thereof which should be taken in conjunction with the prior described drawings.

DETAILED DESCRIPTION OF THE PREFERRED EMBODIMENT

The description that follows is presented to enable one skilled in the art to make and use the present invention, and is provided in the context of a particular application and its requirements. Various modifications to the disclosed embodiments will be apparent to those skilled in the art, and the general principals discussed below may be applied to other embodiments and applications without departing from the scope and spirit of the invention. Therefore, the invention is not intended to be limited to the embodiments disclosed, but the invention is to be given the largest possible scope which is consistent with the principals and features described herein.

An embodiment of the present invention 100 generally provides a mounting block for mounting sonar transducers or other equipment onto the hull of a boat without the need for drilling holes into the transom of boats below the waterline, and a method of its use. While it is particularly useful in boating, generally transducer mounting block 100 of the present invention may be used in any application wherein it is desirable to mount an object without drilling holes into the surface to which that object is to be mounted.

Figure 1:
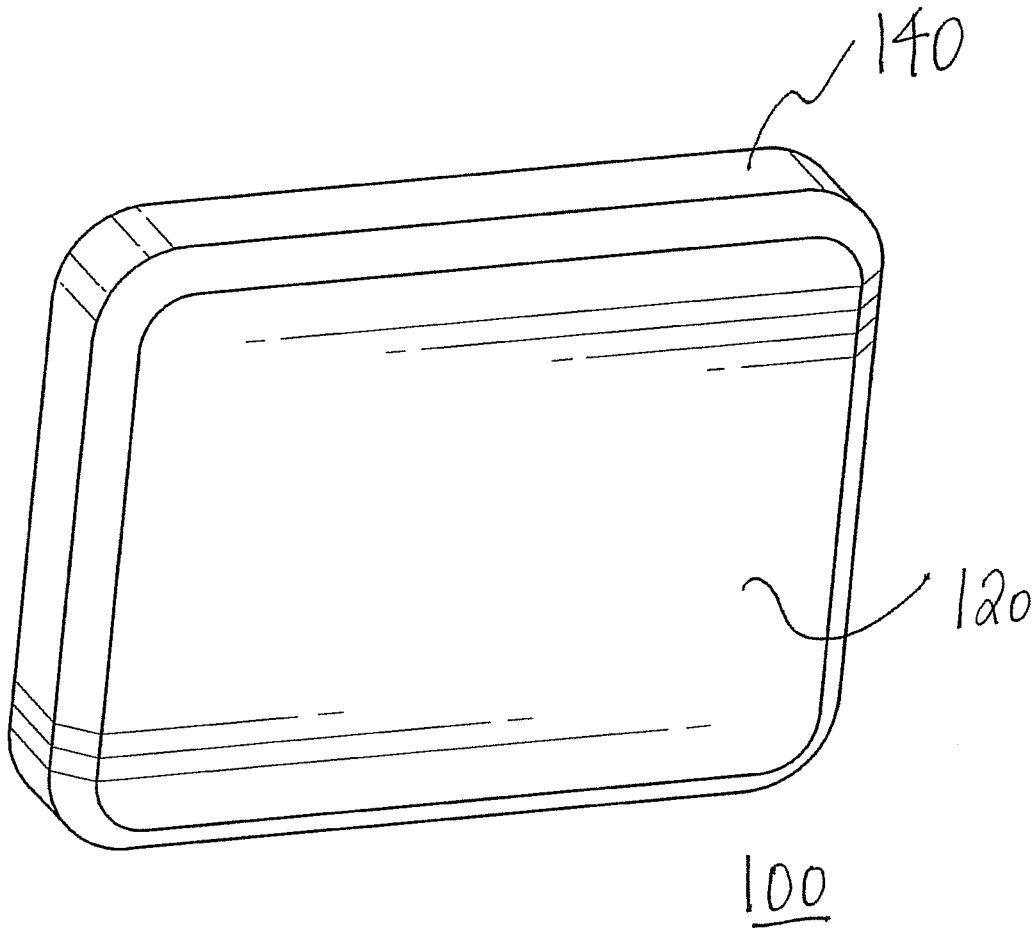
FIG. 1 is a representative isometric view of the front panel 120 of transducer mounting block 100 of the present invention.
Figure 2A:
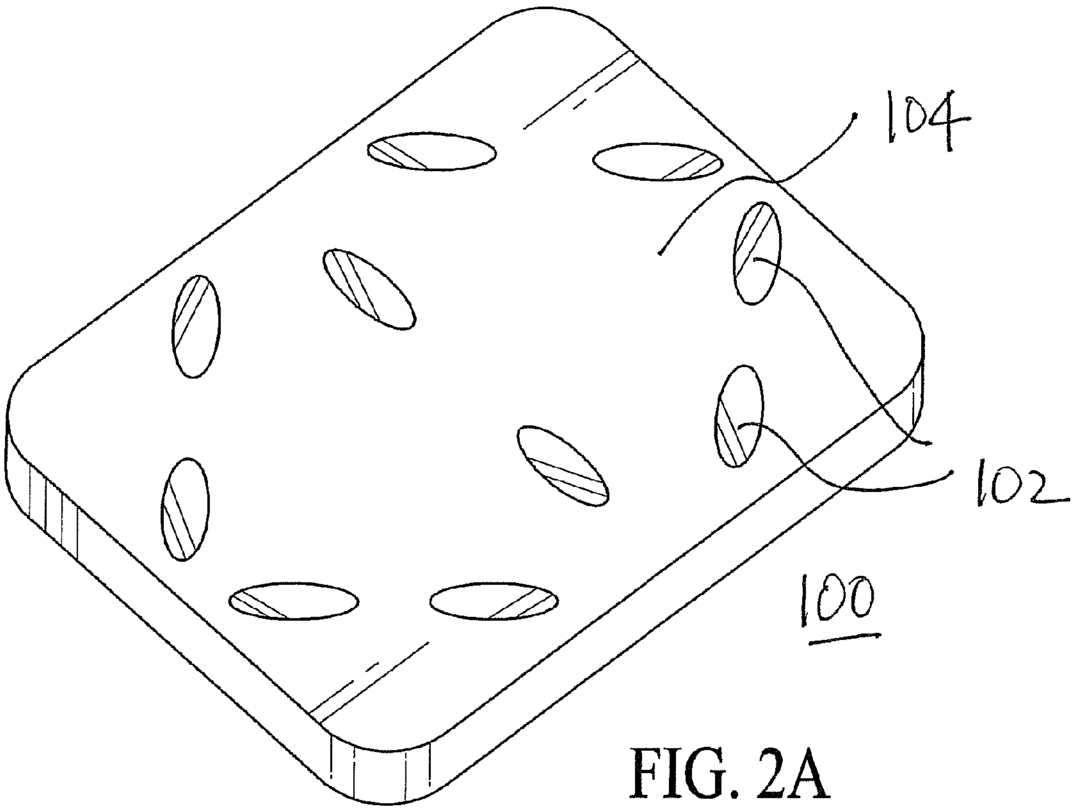
FIG. 2A is a representative isometric view of the back panel 104 of v-shaped groove design of transducer mounting block 100 of the present invention.
Figure 2B:
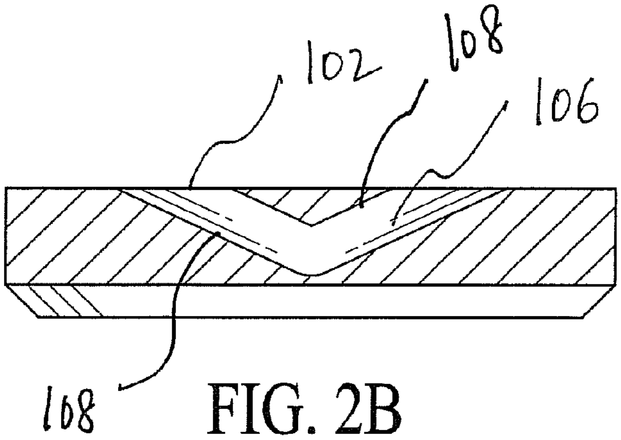
FIG. 2B is a representative sectional view showing the v-shaped adhesive channel groove 106 of the alternative dovetail design of transducer mounting block 100 of the present invention.

FIG. 1 is a representative isometric view of the front panel 120 of transducer mounting block 100 of the present invention. FIG. 2A is a representative isometric view of the back panel 104 of v-shaped design of transducer mounting block 100 of the present invention. FIG. 2B is a representative sectional view showing the v-shaped adhesive channel groove 106 of the v-shaped design of transducer mounting block 100 of the present invention. As best shown in FIGS. 1 and 2A, in one embodiment, transducer mounting block 100 of the present invention is a flat rectangular block structure consists of one smooth front panel 120, 4 side panels 140 and a back panel 104 having channel groove openings 102. The front panel 120 may be configured to provide a mounting surface for a sonar transducer and/or other equipment, and the back panel 104 configured to interface with the transom of a boat. In one embodiment, the transducer mounting block 100 may be made from high-density polyethylene, rubber, polymers and other water resistant and durable building materials and may be sized to accommodate any sonar transducer fastened thereon.

In one embodiment, the main function of channel groove openings 102 is to provide an opening for loading adhesive into v-shaped channel grooves 106. As best shown in FIG. 2B, a plurality of channel groove openings 102 pairs drilled into the transducer mounting block 100. In one embodiment, the individual channel openings of each pair may be configured to intersect with each other thereby creating a v-shaped channel groove 106 within transducer mounting block 100. In this particular embodiment, multiple v-shaped channel grooves 106, quantity and locations of v-shaped channel grooves according to the size of transducer mounting block 100, are drilled into but not through transducer mounting block 100.

In one embodiment, during the mounting process, each v-shaped channel groove is filled with an adhesive [not shown] such as an epoxy, through channel openings 102. Subsequently and optionally, additional adhesive can be applied on back panel 104 to increase adhesion. The transducer mounting block 100 is then pressed against and set in place on the transom of a boat [not shown] with the adhesive-coated back panel 104 in contact with the transom or boat hull. The transducer mounting block 100 may be held in place by means temporarily as the adhesive is allowed to harden. The adhesive thereby forms a bond, bonding to the surface of the transom and mechanically gripping the internal surface 108 of the v-shaped channel grooves 106 and back panel 104. In one alternative embodiment, v-shaped channel grooves 106 can be threaded to increase such mechanical grip in the threaded internal surface 108', further enhancing adhesion of the present invention 100 to the transom of a boat.

Figure 3A:
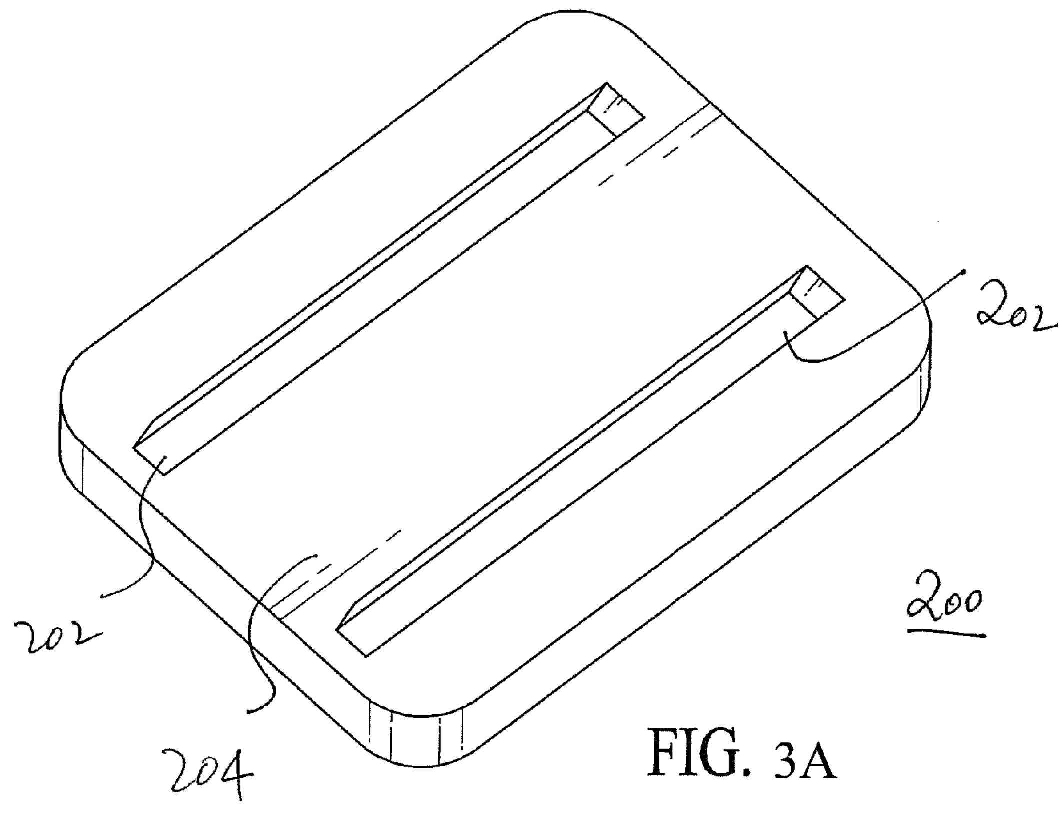
FIG. 3A is a representative isometric view of the back panel 204 of alternative dovetail design of transducer mounting block 200 of the present invention.
Figure 3B:
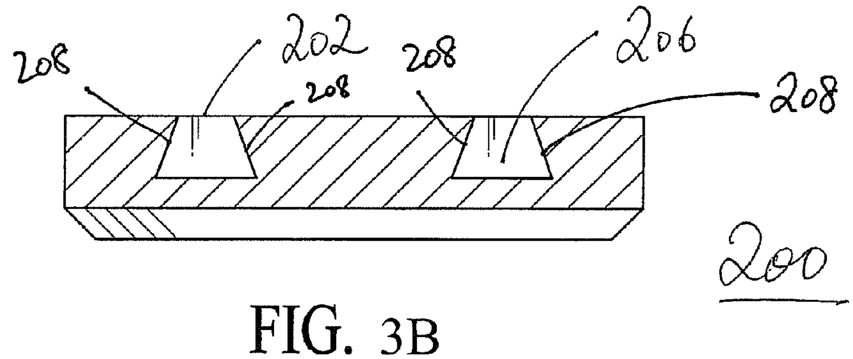
FIG. 3B is a representative sectional view showing the dovetail adhesive channel groove 206 of the alternative dovetail design of transducer mounting block 200 of the present invention.

FIG. 3A is a representative isometric view of the back panel 204 of alternative dovetail design of transducer mounting block 200 of the present invention. FIG. 3B is a representative sectional view showing the dovetail channel grooves 206 of the alternative dovetail design of transducer mounting block 200 of the present invention. In this particular alternative embodiment, as best shown in FIGS. 2A and 2B, back panel 204 further consists of one or more dovetail channel grooves 206 with openings 202. The one or more dovetail channel grooves 206 may serve the same purpose as the v-shaped channel grooves, i.e., to provide a surface that may be mechanically gripped or coupled by the hardened adhesive. As best shown in FIG. 3A, dovetail channel grooves 206 are straight trenches that have a dovetail cross-section shape to retain adhesive. During the mounting process, dovetail channel grooves 206 are filled with an adhesive such as epoxy. The dovetail channel grooves may extend to a defined depth within transducer mounting block 200, but do not penetrate the front panel 220 of the present invention 200. The adhesive thereby forms a bond, bonding to the surface of the transom and mechanically gripping the internal surface 208 of the dovetail channel grooves 206 and back panel 204. In one alternative embodiment, internal surface 208' of dovetail channel grooves 206 can be further textured to increase such mechanical grip in the textured internal surface 208', further enhancing adhesion of the present invention 100 to the transom of a boat.

Figure 4:
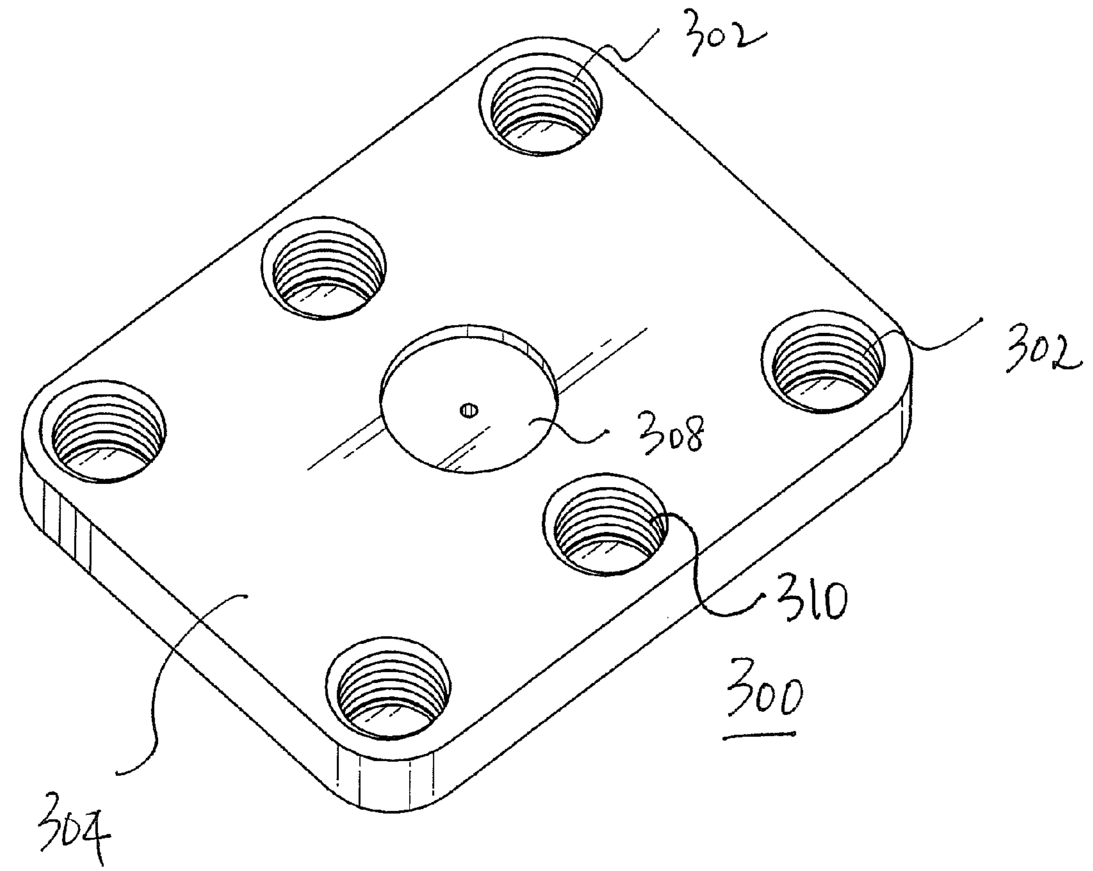
FIG. 4 is a representative isometric view of the back panel 304 of alternative screw design of transducer mounting block 300 of the present invention.

FIG. 4 is a representative isometric view of the back panel 304 of alternative screw design of transducer mounting block 300 of the present invention. As best shown in FIG. 4, the main difference of this alternative design 300 is the introduction of threaded holes 302. Essentially the same as other alternative designs 100 and 200, during the mounting process, tapped threaded holes 302 are filled, and the back panel 304 is coated with a fluid adhesive such as an epoxy. Transducer mounting block 300 is then set in place on the transom of a boat with the adhesive-coated back panel 304 in contact with the transom. The mounting block 300 may need to be held in place as the adhesive is allowed to harden. The adhesive thereby bonds, bonding to the surface of the transom and mechanically gripping the threaded internal surface 310 of the tapped threaded holes 302. In one embodiment, a center hole 308 can be drilled through and perpendicular to front panel 320 of transducer mounting block 300 to accommodate mounting of a sonar transducer 90 to the front panel 320 of the mounting block 300. The center hole 308 may not extend to the full thickness of transducer mounting block. A sonar transducer 90 may be mounted onto the front panel 320 by means of a plurality of screws.

Figure 5:
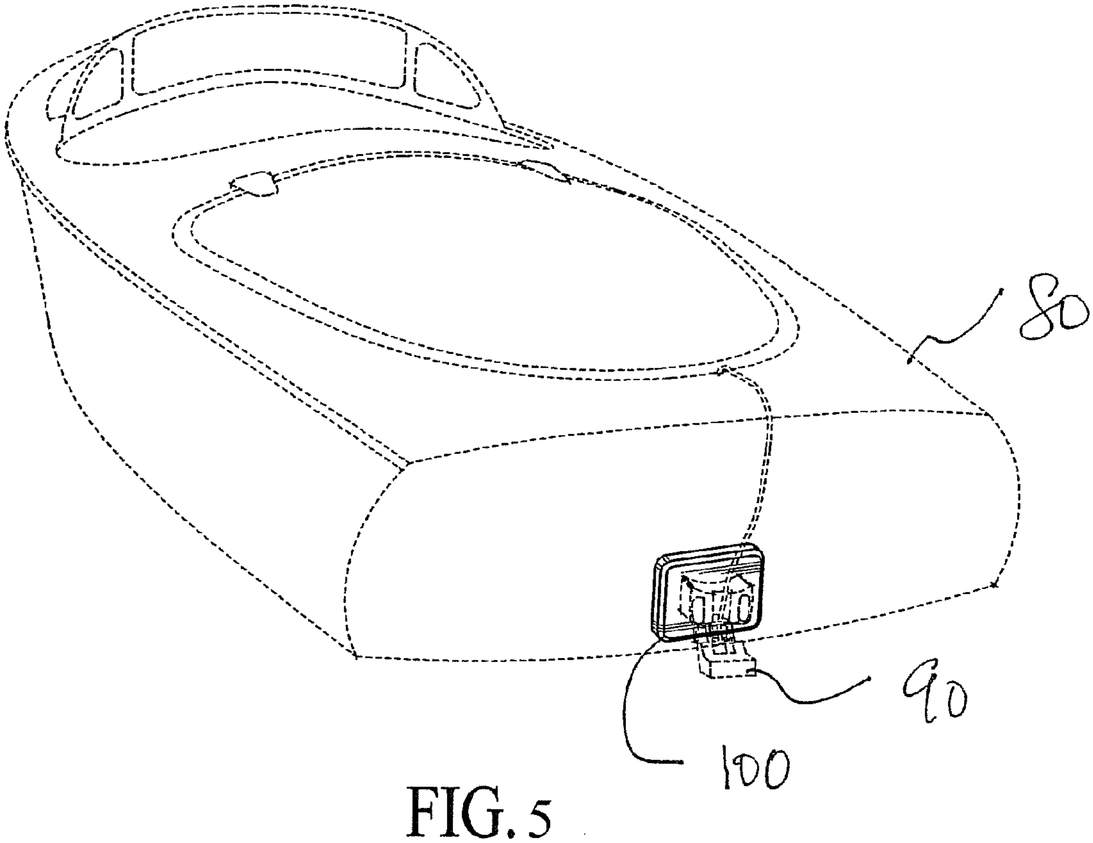
FIG. 5 shows one representative method of use of the transducer mounting block 100 of the present invention.

FIG. 5 shows one representative method of use of the transducer mounting block 100 of the present invention. In one embodiment, transducer mounting block 100 is adhered to the transom of a boat 80 below the waterline without any hole drilling. Subsequently, sonar transducer 90 is fastened to transducer mounting block 100 by mechanical means and/or chemical means. Users can easily mount or dismount transducer and/or other equipment 90 from transducer mounting block without disturbing the structure of the transom as no holes are drilled.

A method of installing a sonar transducer onto the hull or transom of a boat comprises the following steps:

Obtaining a mounting block, the mounting block having a front face, a rear face, and one or more mechanical gripping features designed and configured to provide a mechanical gripping surface when an adhesive is allowed to harden within the gripping features;

Filling the one or more gripping features with the adhesive and coating the rear face of the mounting block with the adhesive;

Setting the mounting block in place on the transom of a boat with the adhesive coated rear face in contact with the transom;

Holding the mounting block in place against the transom as the adhesive is allowed to harden;

Drilling one or more holes into the front face of the mounting block; and

Mechanically mounting a sonar transducer onto the front face of the mounting block.

In a preferred embodiment, screws threaded into screw holes on the front face of the transducer mount are used to mechanically mount the sonar transducer onto the front face of the mounting block.

For a better understanding of the invention reference is made to the following detailed description of the preferred embodiments thereof which should be taken in conjunction with the prior described drawings.

Unless defined otherwise, all technical and scientific terms used herein have the same meaning as commonly understood by one of ordinary skill in the art to which the present invention belongs. Although any methods and materials similar or equivalent to those described can be used in the practice or testing of the present invention, the preferred methods and materials are now described. All publications and patent documents referenced in the present invention are incorporated herein by reference.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, with the limits only of the true purview, spirit and scope of the invention.

I claim:

1. A mounting block for fastening equipment onto the transom or hull of a watercraft, the mounting block comprising:

a flat body portion formed into a predetermined size and shape, the body further having a front panel and a back panel, the back panel further having one or more channel grooves in the form of threaded holes for retaining an adhesive, the channel grooves further having internal surfaces to provide increased mechanical grip to between the hardened adhesive and a transom or hull of a watercraft.

2. The mounting block of claim 1 in which the body is in the shape selected from the group of shapes consisting of:

square, rectangular, circular, hexagonal, octagonal, triangular, star.

3. The mounting block of claim 1 in which the body is made of a material selected from the group of building materials consisting of:

high density polyethylene, polymer, fiber glass, rubber.

4. The mounting block of claim 1 in which the internal surfaces of the channel grooves are textured to increase the mechanical grip to the hardened adhesive.

5. The mounting block of claim 1 in which the front panel further has mechanical means to fasten a sonar transducer securely to the mounting block.

6. The mounting block of claim 5 in which the mechanical means are a threaded nut and bolt system.

7. A method of installing a sonar transducer onto the hull or transom of a boat, the method comprising the following steps:

Obtaining a mounting block, the mounting block having a front face, a rear face, and one or more mechanical gripping features in the form of threaded holes designed and configured to provide a mechanical gripping surface when an adhesive is allowed to harden within the gripping features;

Filling the one or more gripping features with the adhesive and coating the rear face of the mounting block with the adhesive;

Setting the mounting block in place on the transom of a boat with the adhesive coated rear face in contact with the transom;

Holding the mounting block in place against the transom as the adhesive is allowed to harden;

Drilling one or more holes into the front face of the mounting block; and

Mechanically mounting a sonar transducer onto the front face of the mounting block.

* * * * *